Oct. 29, 1929.   W. R. UGGLA ET AL   1,733,703
CENTRIFUGAL CLUTCH
Filed June 23, 1927

W. R. Uggla and
A. G. F. Wallgren
INVENTOR

By: Marks & Clark
Att'ys.

Patented Oct. 29, 1929

1,733,703

UNITED STATES PATENT OFFICE

WILHELM ROBERT UGGLA, OF MORBY, STOCKSUND, AND AUGUST GUNNAR FERDINAND WALLGREN, OF STOCKHOLM, SWEDEN

CENTRIFUGAL CLUTCH

Application filed June 23, 1927, Serial No. 200,967, and in Sweden May 7, 1926.

This invention relates to centrifugal clutches of a type in which bodies, blocks or the like, actuated by centrifugal force and locking the clutch members to one another are connected to the driving member of the clutch by means of plate-springs, which permit the centrifugal bodies to move outwards and to bear against the second member with friction and cause the said second member to participate in the rotation.

According to the invention the centrifugal clutches of such a type are so arranged, that the said bodies, etc., or briefly the centrifugal bodies are caused to bear against the driven clutch member with a uniform surface pressure, thus reducing the wear of the centrifugal bodies and the driven clutch member to a minimum and rendering the running uniform.

The invention consists in an improved centrifugal clutch in which the clutch bodies acted upon by centrifugal force during the rotation of the clutch are connected with their clutch member by means of plate-springs in which the mean plane of the springy carriers passes substantially through the point of action of the resultant of the frictional forces between the bodies and the other clutch member.

Figure 2:
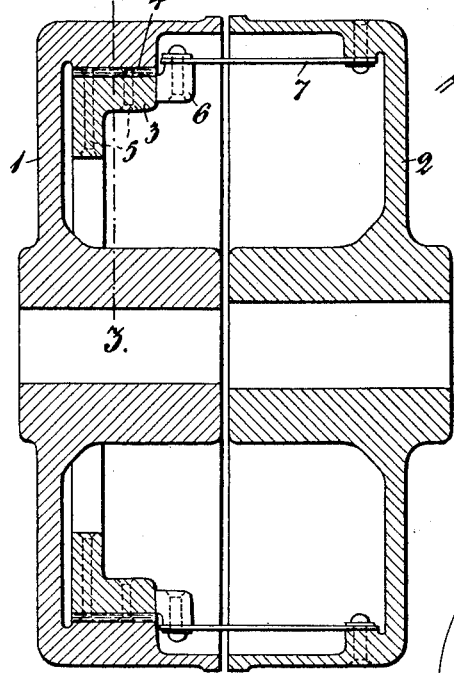
Figure 3:
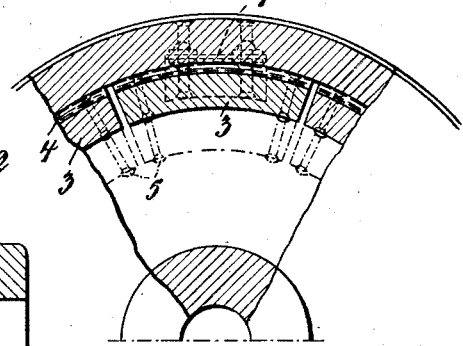
Figure 1:
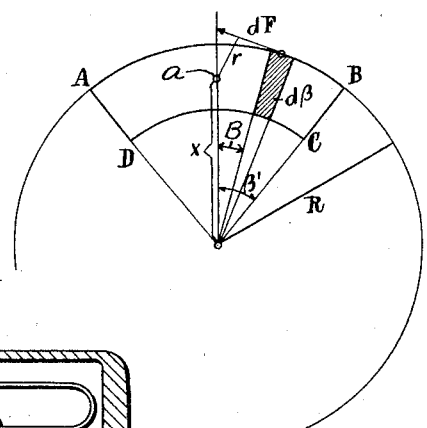
Figure 4:
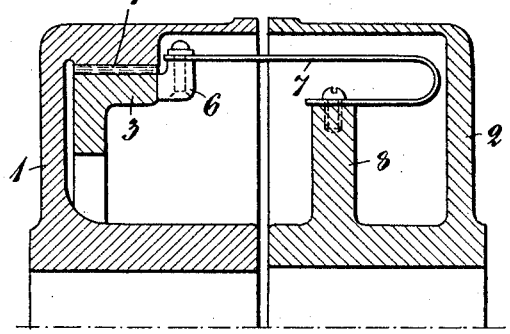
Figure 5:
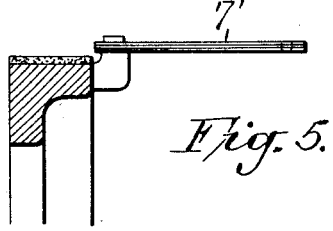

In the accompanying drawing Fig. 1 is a diagram illustrating a calculation of the moment of torsion of a centrifugal body of a clutch. Fig. 2 shows in a longitudinal section a centrifugal clutch arranged in accordance with this invention. Fig. 3 is a section on the line 3—3 of Fig. 2. Fig. 4 shows in a longitudinal section a portion of a clutch arranged in accordance with a second form of execution of the invention, and Fig. 5 is a fragmentary elevational detail of a modified form of spring means.

It is assumed, that ABCD, Fig. 1, is a body or block which by the centrifugal force is pressed against one of the clutch members along the surface AB and that the clutch rotates clockwise. One now has $dF$=the frictional force at the surface element $Rd\beta$, where F designates the frictional force per centimeter of the length of the periphery. As $Rd\beta$ also=the arc at the said surface element so is $dF = FRd\beta$. Consequently, on the element $d\beta$ acts a friction moment.

$$dM = r.dF = r.Frd\beta$$

the moment being taken with respect to an arbitrary point on the distance $x$ from the centre of the clutch. Consequently, one has $$dM = FR(R - x \cos \beta) d\beta$$

and the whole friction moment $$M = 2FR \int_0^{\beta'} (R - x \cos \beta) d\beta$$

where $\beta'$ is equal to ½ of the angle between the radial lines drawn through the ends of the friction surface of the centrifugal body.

For M=0 the acting point of the resultant is determined by the corresponding value of $x$ consequently $$0 = \int_0^{\beta'} (R - x \cos \beta) d\beta$$

and $$x = \frac{\beta'}{\sin \beta'} \cdot R.$$

Consequently $x$ is greater than R except at the limit $\beta'=0$ in which case $x$=R. Owing to the fact, however, that the centrifugal body is not infinitely thin peripherally the acting point of the resultant, practically, always must be located above or outside the bearing surface AB.

In centrifugal clutches hitherto known, however, the acting points of the carrier on the centrifugal body are located below the periphery, which results in the said body having, so to say, a tendency to tilt round the corner B, i. e. the surface pressure on the centrifugal body in question is concentrated toward the direction of motion. Very great surface pressures may hereby be effected, which result in a rapid wear. This drawback has been removed by arranging the centrifugal clutch in the manner stated below.

1. Fig. 2, is a drum provided with a hub by means of which the drum is fixed on the driven shaft. 2 is a second drum provided with a hub and adapted to be fixed on the driving shaft. The open ends of the drums face one another and inside the drums the centrifugal clutch is provided. The said clutch comprises a number of centrifugal bodies, for instance eight bodies or blocks 3, which, if necessary, may be covered with a friction material 4, fixed to the block for instance by means of rivets 5. Block 3 has an angular projection 6, to which is fixed, for instance riveted, one end of a plate spring 7, the other end of which is fixed or riveted to the drum 2.

As the drum 2 is rotated, each block 3 is moved outwards by the centrifugal force and pressed against the inner side of the drum 1. The stiffness of the springs 7 peripherally may, easily, be so adapted, that the springs bring with themselves the drum i. e. transmit the rotary motion even at the greatest occuring load. As perceived from the drawing, the acting point of the conveyor or spring 7 on the block 3 is located at a higher level than the cylindrical surface of the drum 1, against which the block is forced, or outside the said surface. The location of the said acting point has been so chosen, that it lies just at such a high level as corresponds to the acting point of the resultant of the friction forces. In accordance with the above calculation the moments of torsion acting upon the centrifugal bodies or blocks will be nil. Owing to this fact the centrifugal blocks bear against the drum 1 with a constant surface pressure and, consequently, are subjected to a minimum of wear, and besides the running becomes as uniform as possible and free from vibrations, when the blocks slide on the inner surface of the drum 1. A location of the shafts laterally with relation to one another has no influence upon the function of the clutch, because the relative movement of the clutch members thus effected results only in the springs being bent in a harmless manner without any sliding movement of the bodies taking place.

Instead of single plate springs bundles of plate springs 7' (as shown in Fig. 5) may evidently be used. In order to increase the flexibility of the springs or bundles of springs radially while their stiffness peripherally or tangentially is maintained the springs 7 may be U-shaped, as shown in Fig. 4 and fixed to a support 8 provided in the drum 2.

The invention may, evidently, be modified in many other respects without exceeding the limits of the same.

We claim:

An improved centrifugal clutch comprising a driving member, a driven member, a plurality of movable bodies adapted for engagement with said driven member, a plurality of yieldable spring members for securing said bodies to said driving member, said spring members being mounted with respect to said driven member so that the plane in which each yieldable element lies is substantially coincident with the line of action of the resultants of the frictional forces between its respective body and the driven member.

In testimony whereof we have hereunto affixed our signatures.

WILHELM ROBERT UGGLA.
AUGUST GUNNAR FERDINAND WALLGREN.